(No Model.)
F. ECAUBERT.
METHOD OF ORNAMENTING CIRCULAR DIES OR ARTICLES.
No. 434,540. Patented Aug. 19, 1890.
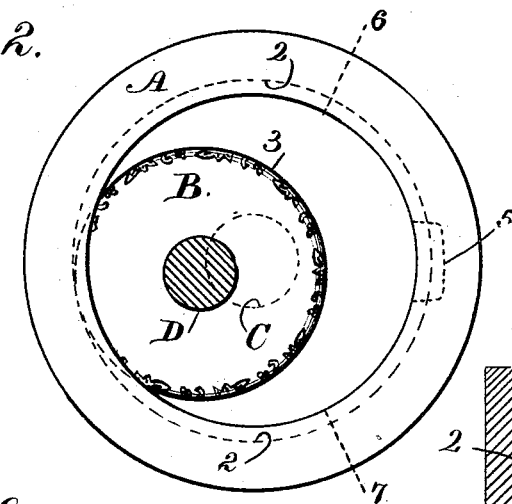
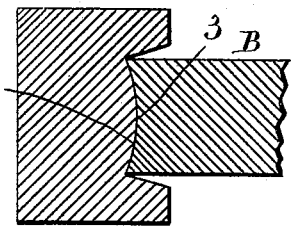
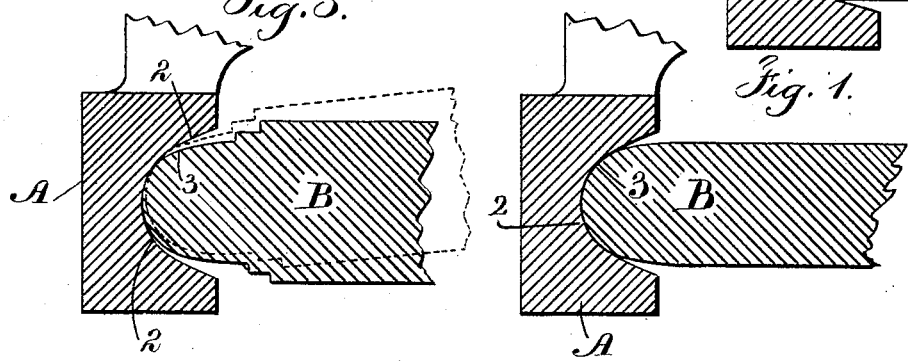
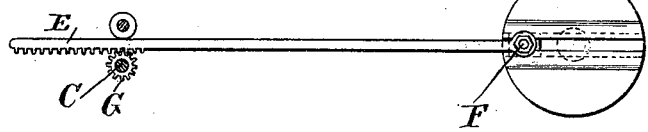
Witnesses
Chas. H. Smith
J. Staib
Inventor
Frederic Ecaubert.
per Lemuel W. Serrell
atty

UNITED STATES PATENT OFFICE.

FREDERIC ECAUBERT, OF BROOKLYN, NEW YORK.

METHOD OF ORNAMENTING CIRCULAR DIES OR ARTICLES.

SPECIFICATION forming part of Letters Patent No. 434,540, dated August 19, 1890.

Application filed July 27, 1889. Serial No. 318,904. (No model.)

*To all whom it may concern:*

Be it known that I, FREDERIC ECAUBERT, of Brooklyn, in the county of Kings and State of New York, have invented an Improved Method of Ornamenting Circular Dies or Articles, of which the following is a specification.

In Letters Patent No. 253,355, granted to me, I have shown an internal or ring-shaped die that is adapted to the manufacture of watch-case centers, the watch-case center being extended or rolled out into a die by the action of a roller within the center. In order to make dies of this character that are adapted to the production of ornaments similar to those engraved upon watch-cases by hand, I make within the ring-shaped die an ornamental surface the counterpart of that required upon the periphery of the watch-case center, and my present improvement relates to the method of forming such dies, which is also adapted to the manufacture of watch-case centers or other circular articles, as hereinafter described.

In the drawings, Figure 1 is a section illustrative of my internal die and of the manner in which the same is brought into contact with its converse or counterpart. Fig. 2 is a face view of the circular die and the circular article within the same. Fig. 3 is a diagram representing some of the positions in which one circular article may be placed to the other. Fig. 4 shows a modification in the shape of the die and Fig. 5 shows means for rotating the die or article first in one direction and then in the other direction.

The die A is to be either a complete circle or an arc of a circle of greater or less length, and B is a circular article of a diameter sufficiently less than the diameter of the die A for such article B to be introduced entirely within the die A, and the ornamention is around the interior surface 2 and upon the exterior surface 3 of the article B, and the die A is to be mounted upon a mandrel or axis C, and the article B is to be mounted upon a center shaft or arbor D, and this arbor D is to be held in a head-stock or other suitable support, such as shown in Letters Patent No. 253,355, granted to me, whereby the edge 3 of the article B can be pressed forcibly into contact with the interior surface of the die A.

A rotary movement is to be given to the respective parts A and B, first in one direction and then in the other. It is generally advantageous to communicate this rotary movement, first one way and then the other, to the die A; but the rotary movement may be given to the circular article B. In either instance the rotary movement given to the one part or the other is to be such that the ornamentation upon the surfaces 2 and 3 will either lap slightly or leave a blank space and will not be injured by impressions to any injurious extent from two different parts of the adjacent surface, and I remark that the reciprocating movement, first in one direction and then in the other, can be communicated by a rack E, that receives an endwise movement from the crank-pin F, and the rack acts upon a pinion G upon the arbor or mandrel C when the movement is to be given to the die or A, or upon the center shaft or arbor D when the movement, first in one direction and then in the other, is given to the circular article B. The rotary motion, first in one direction and then in the other, may be given to the parts by any suitable mechanism.

The device shown in Fig. 5 has been used in other machinery and is not claimed by me.

When the surface 2 is concave and the surface 3 is convex, these surfaces can be brought into contact simultaneously throughout the entire portion to be ornamented, or if the concave surface 2 is an arc of a larger radius than the radius of the convex surface 3 one surface can be rocked or moved laterally upon the other surface, as indicated in Fig. 3, to bring all portions of the surfaces into contact successively. It is now to be understood that the article B may be a roller, the periphery of which is engraved with the ornaments that are to be produced, and this engraved roll B is to be hardened after it has otherwise been finished, and the die A is to be of soft steel and the roll B is pressed into contact with the same and the parts move first one way and then the other until the ornamentation of the roll B is pressed into the interior of the die A, and the operations are continued until such die A is entirely ornamented, care being taken in all instances that the ornaments do not overlap to any considerable extent one upon the other, so as to be imperfect, and care also must be taken that the ornamental roll B is not shifted in its relation to the die A, because the respective ornaments upon the die A are to be made by the corresponding part of the roll B, the pressure being exerted and the operations continued until by the repeated rolling actions the ornament is entirely transferred to and completed upon the surface 2 of the die A. After this has been done the die A is to be hardened, as usual.

After the die A has been made and hardened it may be employed for producing the ornament upon the periphery of another circular soft-steel roll by a movement first in one direction and then the other, as such soft steel roll B is held in contact and pressed firmly against the interior surface of the die A; but usually the die A will be employed for ornamenting the exterior surface of a watch-case center or similar article, such watch-case center being pressed firmly into contact with the interior of such die A, and in cases where the interior surface of the die A is the same diameter as the watch-case center to be produced such watch-case center may be pressed outwardly into the die A by a plain roll—such as that represented in my said patent No. 253,355—and the rolling operation will be continued until the metal of the watch-case center is firmly pressed into and receives the ornamentation from the surface 2 of the die A; but where the watch-case center or similar article is of smaller diameter than the die A such watch-case center occupies the position of the circular article B and is to be held upon a chuck or other support, and the parts are moved first in one direction and then in the other while the watch-case center is pressed against the ornamental surface 2 of the die A. In this instance care must be taken to prevent the ornaments overlapping to any considerable extent, and thereby becoming injured; and with this object in view the rotary motion given to the article B, first in one direction and then in the other, must be only a complete rotation or less than a complete rotation, and it will be now apparent that in all instances the ornamentation can be transferred from one surface to the other with accuracy and without such ornamentation being affected or injured by one part slipping on the other, because the portions of the curved surfaces 2 and 3 that are brought into contact, either progressively or simultaneously, approximate so closely to the same proportionate diameters and that one part will not slip upon the other part, and the ornaments will be gradually formed with a fullness and perfection dependent only upon the perfection of the engraving or ornamentation in the original die.

I remark that the die A may be an arc of a circle between the lines 6 and 7, instead of being a complete circle, and in this instance the length of the periphery between such lines 6 and 7 should correspond to the entire length of the periphery of the article B to be ornamented, and in that case the stopping-places, in the reciprocations of the die A, should be when the lines 6 and 7 are radial to the center of the article B, in which instance the pattern produced upon the edge of the article B can be impressed fully up to the line 6 in one direction and up to the line 7 in the other direction, and there may be a small space between the ends of the pattern as thus impressed upon the article B, or the lines of ornament of such pattern may be brought directly together or very slightly overlapping.

In some watch-case centers or other articles the ornaments do not reach all around the same, or there are projections on such articles. In these cases the internal die A may be recessed to the proper extent or cut away, as indicated by dotted lines at 5, and only receive a partial rotation of the desired extent as it is reciprocated.

The interior surface 2 of the die A may be more or less convex in sectional shape, as illustrated in Fig. 4, so that the surface of the watch-case center or other article B may be concave and receive the ornamentation by transfer from the die A.

In cases where there are projecting parts or ornaments on the circular article B the die A may be recessed, and shoulders or ribs may be made upon the interior surface of the die A.

When the ornament or pattern is transferred from the internal die A to the surface of the article B, there may be slight defects at the place where the pattern does not entirely meet or slightly overlaps. This is not detrimental in watch-case centers, because the shank or pendant is usually soldered at this place; but whenever desired the ornamentation can be touched up by a hand engraving-tool, and in cases where the original roll B is engraved with a continuous ornament all around and transferred to the die A a soft roll or other article that is the same size may receive an ornament all around its edge by more than one revolution of such article B, because the ornaments coincide when they lap, having been made in the die A originally by the same part of the engraved and hardened roll.

I claim as my invention—

1. The method herein specified of ornamenting the interior surface of a die, consisting in pressing against such interior surface a roll having around its periphery the ornament to be transferred to the die and giving to the respective parts a rotation or partial rotation, first in one direction and then in the other, substantially as set forth.

2. The method herein specified of transferring a pattern or ornament from a die having ornaments upon the interior surface thereof, consisting in holding against such interior ornamented surface the article to be ornamented and giving to the respective parts a rotation or partial rotation, first in one direction and then in the other, the pressure being sufficient to cause a transfer of the ornamentation from the die to the article, substantially as set forth.

3. The method herein specified of ornamenting circular articles by means of a circular die having ornaments upon the interior portion thereof, consisting in pressing into contact with such circular die the article to be ornamented, giving to the respective parts a motion, first in one direction and then in the other, and moving or rocking the one part upon the other to bring all parts of the article to be ornamented into contact with the ornamenting-die, substantially as set forth.

4. The method herein specified of ornamenting watch-case centers and similar articles by a circular die having the ornaments around the interior surface thereof, consisting in pressing the watch-case center into contact with the ornamented surface of the internal die and giving to the respective parts a motion, first in one direction and then in the other, to press the ornament progressively into the edge of the watch-case center or other article, substantially as set forth.

Signed by me this 22d day of July, 1889.

F. ECAUBERT.

Witnesses:
GEO. T. PINCKNEY,
CHAS. H. SMITH.